United States Patent
Su et al.

(10) Patent No.: US 7,239,610 B2
(45) Date of Patent: Jul. 3, 2007

(54) METHODS AND DEVICES FOR PARTIAL UPPER LAYER FRAME LOSS DETECTION BASED RETRANSMISSION

(75) Inventors: Hsuan-Jung Su, Ocean, NJ (US); Qinqing Zhang, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1155 days.

(21) Appl. No.: 10/198,597

(22) Filed: Jul. 18, 2002

(65) Prior Publication Data
US 2004/0013115 A1    Jan. 22, 2004

(51) Int. Cl.
*H04J 1/16* (2006.01)
*H04J 3/24* (2006.01)
*H04Q 7/00* (2006.01)
*H04B 7/216* (2006.01)
*H04L 12/66* (2006.01)
*H04L 12/28* (2006.01)
*H04L 1/14* (2006.01)

(52) U.S. Cl. .................. 370/230; 370/235; 370/252; 370/328; 370/335; 370/342; 370/356; 370/394; 370/474; 714/750

(58) Field of Classification Search ......... 714/748–749
See application file for complete search history.

(56) References Cited

U.S. PATENT DOCUMENTS

| | | | | |
|---|---|---|---|---|
| 5,222,061 A | * | 6/1993 | Doshi et al. ............... | 370/394 |
| 6,424,625 B1 | * | 7/2002 | Larsson et al. ............ | 370/236 |
| 6,473,399 B1 | * | 10/2002 | Johansson et al. ......... | 370/229 |
| 6,643,813 B1 | * | 11/2003 | Johansson et al. ......... | 714/748 |
| 6,907,005 B1 | * | 6/2005 | Dahlman et al. .......... | 370/236 |
| 6,947,394 B1 | * | 9/2005 | Johansson et al. ......... | 370/282 |
| 7,000,021 B1 | * | 2/2006 | Radhakrishnan et al. ... | 709/230 |
| 7,013,419 B2 | * | 3/2006 | Kagan et al. .............. | 714/749 |
| 7,103,817 B1 | * | 9/2006 | Choksi ...................... | 714/748 |

* cited by examiner

*Primary Examiner*—Chi Pham
*Assistant Examiner*—Melanie Jagannathan

(57) ABSTRACT

The present invention is aimed at techniques for detecting the "partial loss" of an upper layer frame. One technique envisions a detection platform adapted to determine whether a packet is a final packet for a particular upper layer frame. A comparator platform then compares packets received free of transmission errors with variables indicative of whether all received packets in the particular upper layer frame have been received correctly when a final packet is detected. A transmission platform then sends a signal indicative of whether the packets received without transmission errors constitute the particular upper layer frame so that lost packets can be retransmitted quickly.

22 Claims, 3 Drawing Sheets

METHODS AND DEVICES FOR PARTIAL UPPER LAYER FRAME LOSS DETECTION BASED RETRANSMISSION

FIELD OF THE INVENTION

This invention relates to the fields of wireless and wire line communication networks and, more specifically, to methods and devices for the detection of the partial loss of an upper layer frame.

BACKGROUND OF THE INVENTION

A common function of a data communication system is to successfully send data "packets" containing desired information from a transmission point or node to a reception point or node. Before going further, it should be understood that the term "node" may indicate one or more hardware, software or firmware elements which may be combined or used separately to carry out transmission and/or reception of packets, etc. . . . In order for such a system to perform efficiently, bits of information are grouped together to form an "upper layer frame". Upper layer frames are then further subdivided or concatenated into packets, the basic units used for transmission in a communication network.

A communication network's efficiency is measured by how many packets it can successfully send from a transmission node to a reception node in a given time period. This measurement is known as a network's "throughput". Another measure of network efficiency is the amount of time it takes for a packet to get from a transmission node to a reception node. This performance metric is known as "delay". An ideal communication network will transmit the maximum amount of packets between network nodes in the least amount of time.

Several factors prevent both wire line and wireless communication networks from achieving ideal throughput and delay performance. Principally among them are transmission failures caused by interference, weak transmissions or faulty reception. One known technique used to minimize network transmission failures utilizes an Automatic Repeat Request (ARQ) retransmission method of error correction. ARQ retransmission uses a "reverse acknowledgement" channel. This channel can be a stand-alone channel or multiplexed with a "reverse data channel". A reverse acknowledgement channel allows a reception node to provide a transmission node with the status of transmitted packets. These status messages are aptly called "acknowledgements".

ARQ retransmission is used, for example, in a radio link control protocol developed for third generation, 3G communication networks (3G is short for third generation, 3GPP/UMTS radio link protocol communication networks). These networks support wireless bandwidth requirements for telephone calls, global positioning systems, email, Internet access, videoconferencing and streaming audio and video. Today, 3G networks allow data to be transmitted between a transmission node and reception node over a range of 8 kb/sec to 2 MB/sec. Future enhancements may enable 3G networks to transmit data up to 10 MB/sec. An efficient ARQ retransmission method is essential in order to maintain network protocol integrity for commercial applications, especially when it comes to 3G networks which require high data transfer rates.

Before describing the details of the present invention, it may be helpful to first present a simplified explanation of ARQ retransmission and how it applies to 3G networks.

Referring to FIG. 1, there is depicted a simplified block diagram of a conventional communication network 100 comprising a communications channel 110, an acknowledgement channel 112, a reception node 104 and a transmission node 102. In an existing ARQ retransmission method, the transmission node 102 is adapted to send packets stored in a memory unit 106, which can also be referred to as a transmission buffer, along the communication channel 110 to a reception memory unit 108, which can also be referred to as a reception buffer, for examination. Circuitry in the reception node 104 is adapted to examine the incoming packets in the reception memory unit 108 to determine whether they have been transmitted successfully, as further discussed below. If the reception node 104 receives a packet that contains corrupted data, the reception node 104 circuitry is adapted to send a status or acknowledgement message back to the transmission node 102 on the acknowledgement channel 112. More to the point, the reception node 104 will only be adapted to send an acknowledgement when corrupted data is received. This type of ARQ retransmission method is known in the art as a "negative" acknowledgement (NACK) method.

Alternatively, the reception node 104 may be adapted to send an acknowledgement via the acknowledgement channel 112 to the transmission node 102 only when it is determined that a packet sent via communication channel 110 has been received without errors. This type of ARQ retransmission method is known in the art as a "positive" acknowledgement method. In this method, the transmission node 102 is adapted to wait for a predetermined time period to receive an acknowledgement from the reception node 104. If an acknowledgement is not received within the predetermined time period, the transmission node 102 is adapted to retransmit the unacknowledged packet stored in the memory unit 106 to the reception node 104.

It is known in the art that positive and negative ARQ retransmission methods can be combined into a "general" ARQ retransmission method where acknowledgements are sent from a reception node to a transmission node on an acknowledgement channel for every previously transmitted packet in the memory unit. Based on the received acknowledgements, the transmission node will be adapted to determine whether a given previously transmitted packet stored in the memory unit needs to be retransmitted to the reception node. Generally, the transmission node is adapted to wait until it receives an acknowledgement before it makes any decision on whether to continue to hold previously transmitted packets in the memory unit or to clear the unit for the next incoming stream of packets.

As mentioned above, a specific use of a general ARQ retransmission method is in 3G networks. Within a so-called "protocol stack" of a 3G network, a radio link control (RLC) layer contains protocols (e.g., a series of set instructions) used to carry out ARQ retransmission. FIG. 2 is a simplified block diagram illustrating components of an RLC layer 200 relevant to our discussion. As shown, layer 200 comprises a transmission unit 202 and reception unit 210.

The path of a packet can be traced through the RLC layer 200. Upper layer(s) 102$u$ send upper layer frames to the transmission unit 202 which is adapted to process such frames as follows. Before the upper layer frames can be transmitted, segmenting unit 204 is adapted to segment and/or concatenate them into packets. Thereafter, an RLC header unit 206 is adapted to add an RLC header to each packet. Packets are then placed in the memory unit 106 to wait for transmission. (Note that the memory unit may function as either a transmission or retransmission buffer and that these elements may be implemented either by one or more devices, platforms, programs or the like or separate devices). A multiplexer circuit 208 is adapted to select which packets from memory unit 106 will be transmitted during a next "transmission time interval" (TTI) and to calculate when the selected packets will be submitted to a lower layer 102*l* for actual transmission. If the memory unit 106 is implemented using separate transmission and retransmission elements, the selected packets can come from the transmission buffer element, retransmission buffer element or both.

A Medium Access Control ("MAC") layer (not shown) determines the number of packets which can be transmitted per TTI and sends this information to RLC Layer 200 via pathway 300. Header unit 206 is then further adapted to set certain fields, which may represent a variety of protocol variables, within each packet selected for transmission.

Subsequently, selected packets are transmitted via transmission lower layer section 102*l* to reception lower layer 104*l*.

The reception section 210 is adapted to receive transmitted packets from the reception lower layer 104*l*. An expansion unit 212 is adapted to expand the received packets into separate packets and to place them in a reception memory unit 108 until packets associated with an entire reconstructed upper layer frame have been received.

At this point, the reception section 210 is adapted to generate and send acknowledgements and status information on individual packets stored in the reception memory unit 108 to the transmission section 202 as follows. A transceiving unit 214 is adapted to analyze whether the packets within the reception memory unit 108 have been received without errors. The unit 214 is further adapted to send this information to a transmission unit 216 via reverse link 112. (A separate element, such as a reception node transmission unit, may also be adapted to send this information.)

Unit 216 is adapted to control the multiplexer circuit 208 in order to select packets for transmission during the next TTI. When packets are successfully received and acknowledged, a reception header unit 218 is adapted to remove the RLC header from each packet, reassemble the frame and to send the reassembled frame to upper layer 104*u*.

It is generally believed that frequent acknowledgements allow retransmissions to be carried out quickly, which benefits delay performance and overall system efficiency. In addition, frequent acknowledgements allow a memory unit (transmission buffer) to be cleared more frequently. This reduces the likelihood that the memory unit will overflow. Furthermore, frequent acknowledgements can prevent instances of protocol stalling, which occurs when a transmission node is unable to transmit packets even though there are packets available for transmission in its memory unit.

On the other hand, frequent acknowledgements consume the bandwidth of a reverse link, degrade the throughput and delay performance of the reverse link and interfere with other transmissions.

For these and a variety of reasons, current acknowledgement techniques are inefficient. To be efficient, a communication network, including a 3G network, must make efficient use of its limited bandwidth to send the most amount of information in the least amount of time. While, as discussed above, existing acknowledgement techniques generally facilitate faster communications, these techniques must also be utilized efficiently or their benefit to a system's performance will be lost. Therefore, it is unacceptable to allow an uncontrolled volume of acknowledgement signals to be sent to a transmission node.

There is a particular need in the art of wireless and wire line communication network protocols, especially RLC layer acknowledgement protocols utilized in 3G communication networks, for acknowledgment techniques that balance the need to retransmit negatively or unacknowledged packets with the need to maintain overall network efficiency. Further, retransmission must be managed so that error correction can be invoked as fast as possible, but is utilized conservatively to prevent excessive delays and protocol stalling.

There is also a need in the art for techniques adaptable to rectify transmission errors occurring in 3G and other communication networks that improve the throughput of the network and reduce delays relative to current retransmission schemes. For data communication, where the integrity of the upper layer frames is essential to reliable service, such techniques should also be able to detect whether the transmission time of an upper layer frame has been prolonged, and appropriately retransmit associated packets to reduce the packet delay for the upper layer frame.

Finally, there is a need in the art for data packet retransmission techniques that incorporate the performance enhancing characteristics described above and are general enough to be incorporated into a variety of data communication networks, not just 3G communication networks.

SUMMARY

Accordingly, the present invention envisions techniques for detecting the partial loss of an upper layer frame. A detection platform determines whether a received packet is a final packet in a particular upper layer frame. A comparator platform is then adapted to compare variables indicative of whether all packets in the particular upper layer frame have been received correctly when a final packet is detected. Finally, a transmission platform is adapted to send a signal indicative of whether a correct version of the particular upper layer frame was received so lost packets can be retransmitted quickly.

Other features of the present invention will become apparent upon reading the following detailed description of the invention, taken in conjunction with the accompanying drawings and the appended claims.

DETAILED DESCRIPTION OF THE INVENTION

Those skilled in the art should note that while certain elements of the following invention are referred to as transmission or reception nodes, the functions of these elements can be carried out by the same program, module or device, such as a transceiver. The nomenclature in the discussion above and below is used merely to present features and functions of the invention in a clearer form, rather than to limit any particular program, module or device that may be utilized to implement these features and functions.

One embodiment of the present invention is implemented within a 3G communication network. However, the present invention is robust enough to be applied to any communication network that utilizes retransmission. The protocol stack for a preferred 3G communication protocol consists of a few layers, among them the RLC layer, a lower layer and a MAC layer. The present invention envisions the retransmission of packets from the RLC layer. In one embodiment of the present invention, a TTI comprises a predetermined time interval that begins when an RLC layer sends packets to a lower layer for transmission.

Figure 1:
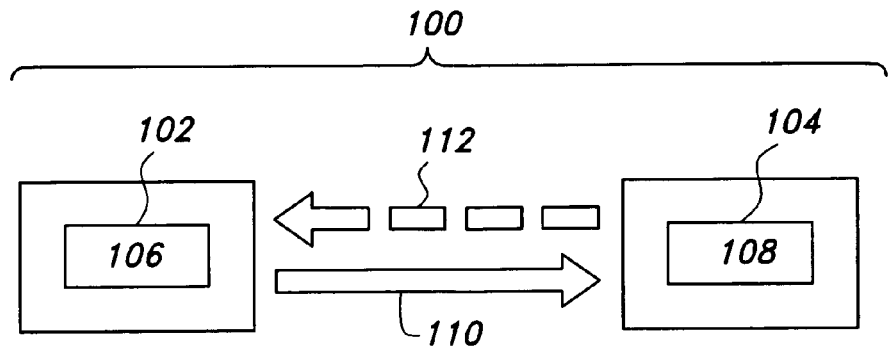
FIG. 1 is a simplified block diagram of a conventional communication network with an acknowledgement channel from a reception node to a transmission node.
Figure 2:
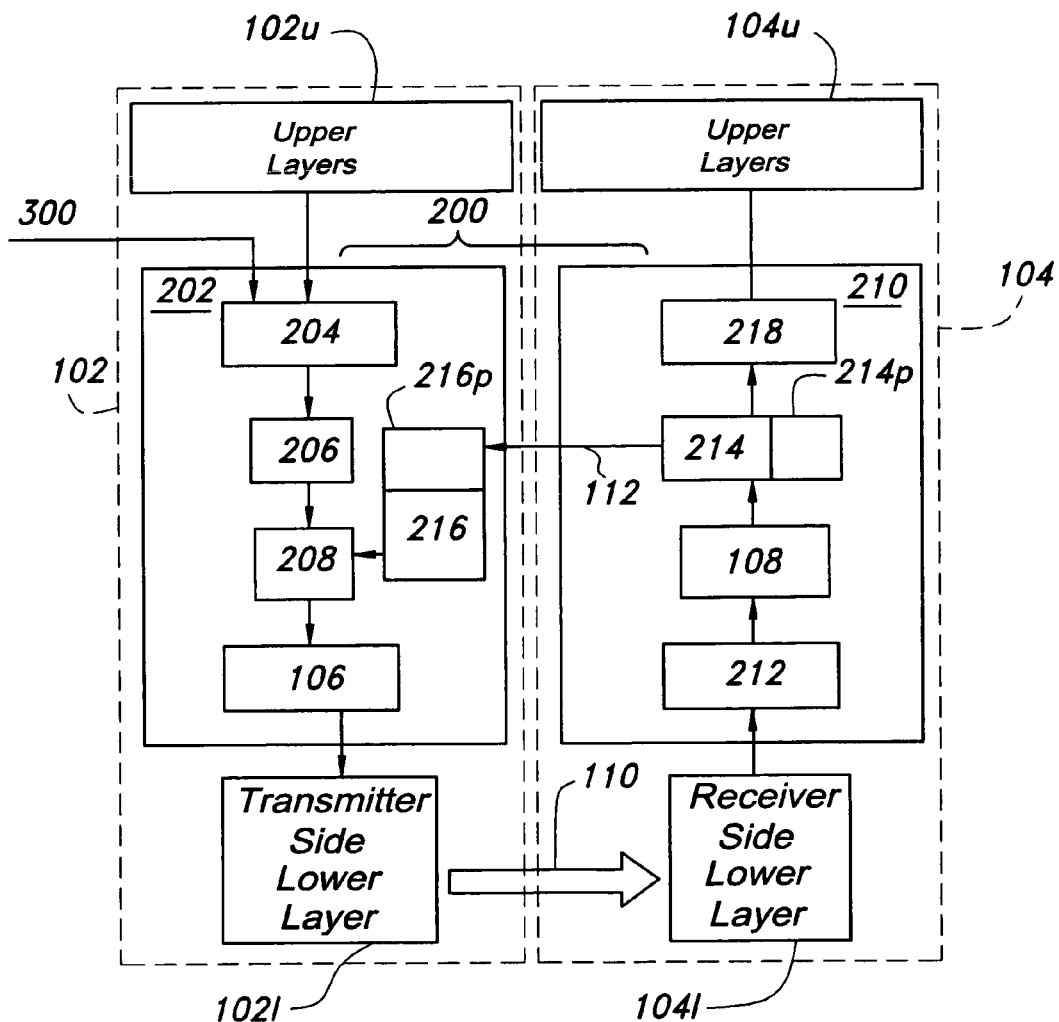
FIG. 2 is a simplified block diagram illustrating elements of an RLC layer which may be used to carry out techniques envisioned by the present invention.

Before going any further, it should be understood that the elements shown in FIG. 2 may be modified to carry out the features and functions envisioned by the present invention as described below.

Figure 3:
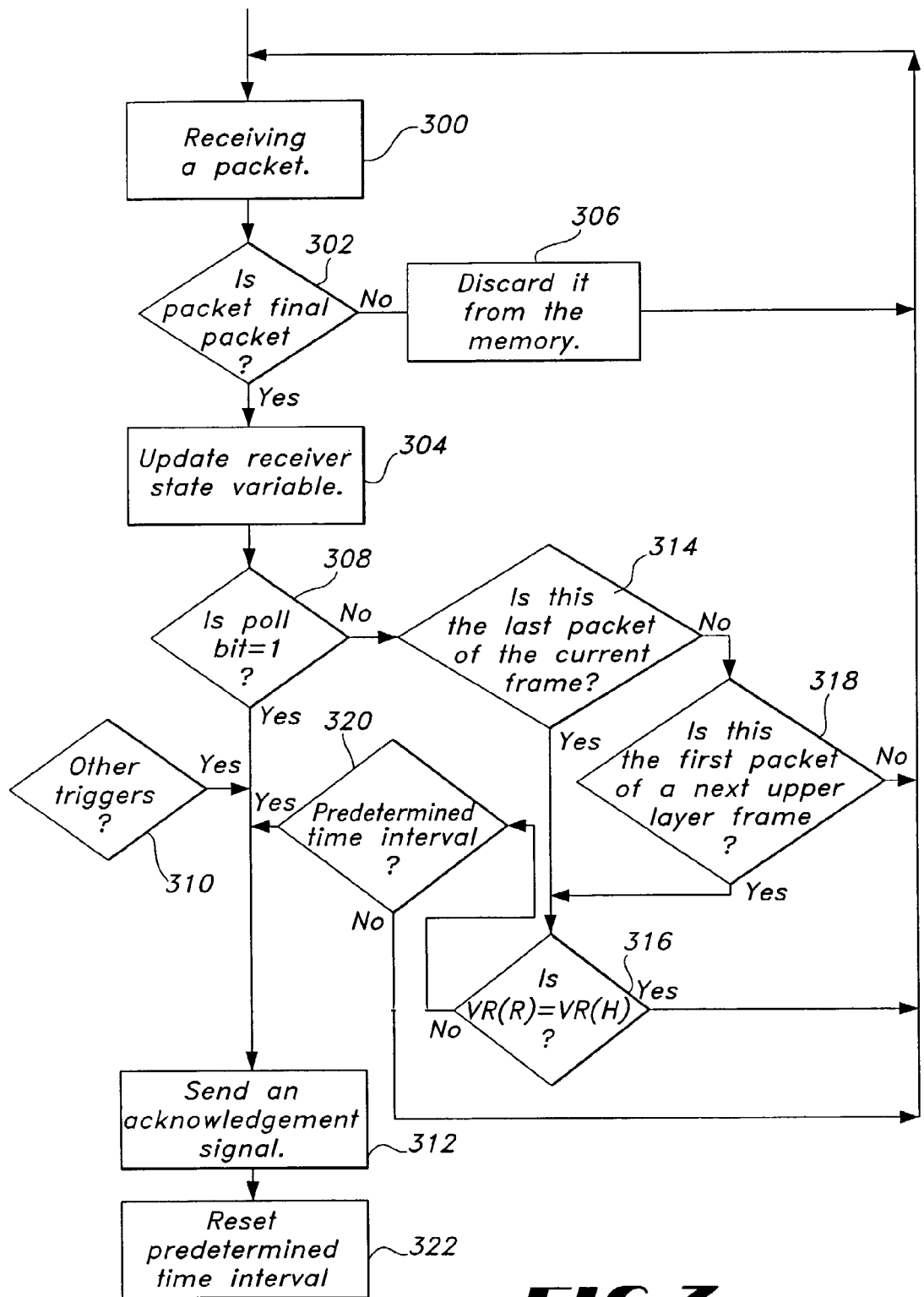
FIG. 3 is a flow diagram illustrative of techniques according to embodiments of the present invention.

FIG. 3 is a flow diagram illustrative of a technique for detecting the partial loss of an upper layer frame. In one embodiment, this technique utilizes a "detection of missing data packets" RLC protocol that causes an acknowledgement transmission to be sent from a reception node, such as node 104 in FIG. 2 to a transmission node 102 when the partial loss of an upper layer frame is detected. This technique manages the volume of acknowledgement signals and thus, maximizes network efficiency and speed. In this embodiment, each upper layer frame is associated with a variable, predetermined time period which may be reset whenever an acknowledgement transmission is triggered by missing packets in the upper layer frame. The acknowledgement transmission takes the form of a "status report" packet, but because the inventions envisioned by the inventors are not limited to any particular communications protocol, other methods of sending acknowledgement signals are equally suitable.

In operation, a transmission node 102 is adapted to transmit packets and the reception lower layer 104l is adapted to receive at least one previously transmitted packet in step 300. A platform 216p is adapted to transmit at least one packet in a particular upper layer frame and to implement various other functions using any combination of hardware, software and/or firmware. The received packets are then routed to the reception memory unit 108 for analysis by the unit 214. The unit 214 comprises a platform 214p which again may comprise hardware, software, firmware or any combination of these elements adapted to implement the various functions described below. The platform 214p comprises a transmission platform adapted to send acknowledgement signals.

Continuing, when a packet is successfully received, then the platform 214p is adapted to update a receiver variable, which can be a receiver state variable, VR(R), indicative of the sequence number (SSN) of the next in sequence packet expected to be received. If a received packet contains corrupted data, it can be discarded from the reception memory unit 108 in step 306 because retransmission will be necessary.

It should be noted that in the RLC protocol environment, the platform 216p may be adapted to set a polling bit in a "packet header" in order to instruct platform 214p to send an acknowledgement signal for previously transmitted packets at any time as in step 308. If the polling bit is set then, notwithstanding other trigger protocols in step 310, the platform 214p is adapted to send an acknowledgement transmission back to platform 216p regarding the status of the previously transmitted packets in step 312.

The platform 214p may further comprise a comparator platform that is adapted to determine that a received packet is the final packet for a particular upper layer frame as in step 314. The platform 214p is further adapted to compare the SSN of the received packet with the receiver state variable VR(R) to determine whether they are equal in step 316. If they are not equal, this indicates that there are one or more packets that have not been successfully received for the particular upper layer frame.

If the predetermined time period associated with a particular upper layer frame has expired in step 320, the platform 214p is further adapted to send an acknowledgement signal indicative of whether a correct version of the particular upper layer frame was received. (As stated above, it should be noted that the acknowledgement signal triggered by the "detection of missing data packets" RLC protocol is regulated by a predetermined time period associated with the upper layer frame.) In an alternative embodiment, the platform 214p is adapted to send another signal indicative of which additional packets of the correct version of the particular upper layer frame need to be received in step 312. For example, this signal could contain a complete list of missing sequence numbers representing the packets that need to be retransmitted in order to reconstitute the upper layer frame. The predetermined time period associated with the particular upper layer frame is reset when the platform 214p sends an acknowledgement signal in step 322. On the other hand, if the platform 214p determines that the magnitudes of the state variables are equal and the received packet is determined by the platform 214p to be the last in-sequence packet of the particular upper layer frame, then the entire particular upper layer frame has been successfully received.

In another embodiment, if the platform 214p determines that the received packet is not the final packet for the particular upper layer frame, then the platform 214p is further adapted to determine whether the received packet belongs to a next particular upper layer frame in step 318. If the received packet does not belong to a next particular upper layer frame, then there are still packets yet to be received for the (current) particular upper layer frame. If, though, the received packet does belong to a next particular upper layer frame, then the state variables for the current particular upper layer frame are not equal in step 316 and at least the final packet for the current particular upper layer frame has not been successfully received. If the predetermined time period associated with the current particular upper layer frame has expired in step 320, the platform 214p is adapted to send a signal indicative of which additional packets of the correct version of the particular upper layer frame need to be received from platform 216p as in the embodiment described above. The platform 214p resets the predetermined time period when it sends an acknowledgement signal in step 322.

In yet another alternative embodiment, the received packet may comprise a "super field" series of header control bits that identifies the packet's particular upper layer frame. The platform 214p is further adapted to detect whether a received packet comprises a super field and to analyze the super field to determine whether the packet is in a particular upper layer frame. Likewise, the platform 214p is adapted to analyze the super field to determine whether the packet is in a next particular upper layer frame.

In summation, unless platform 216p requests status information by setting a polling bit in accordance with the RLC protocol, the platform 214p is adapted to limit the number of acknowledgement signals sent to a transmission node 102 by detecting all of the missing packets for a particular upper layer frame and waiting for a predetermined time period to expire before sending an acknowledgement transmission to platform 216*p*.

Figure 4:
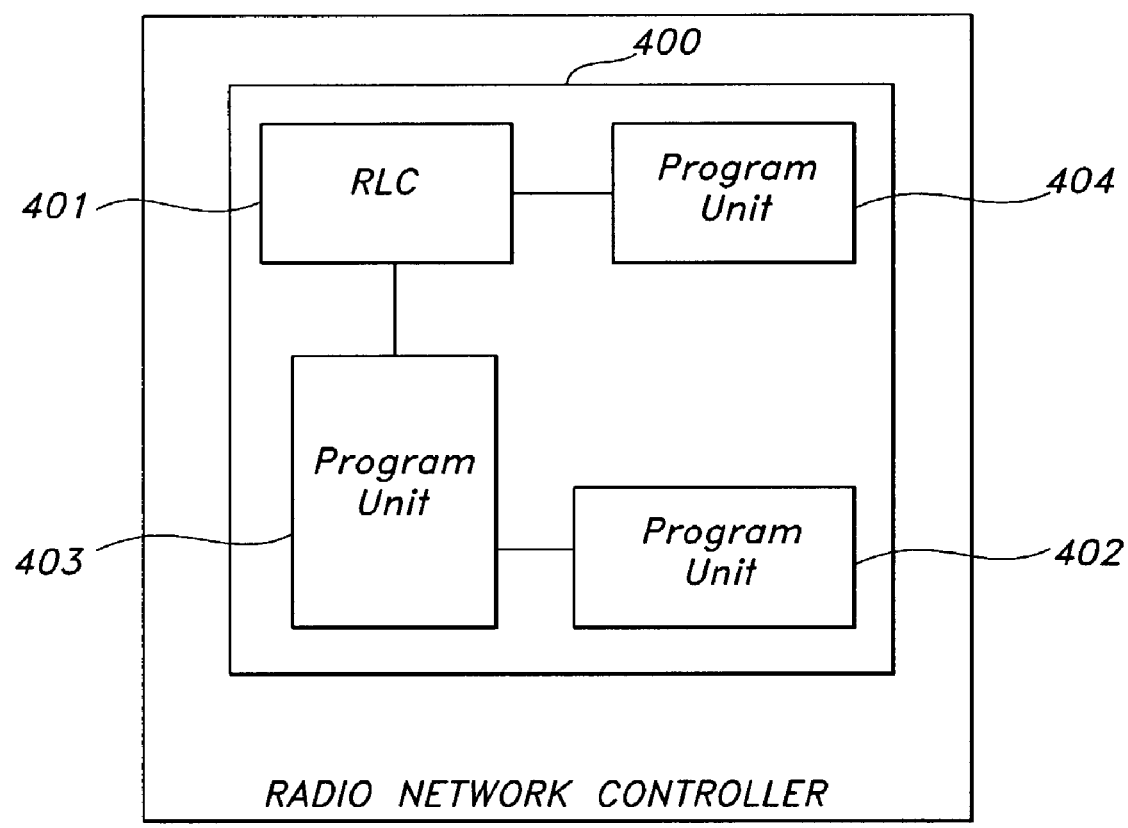
FIG. 4 is a block diagram of a radio network controller according to one embodiment of the present invention.

FIG. 4 is a simplified block diagram of a device 400, such as a traffic processing unit (TPU) adapted to retransmit packets according to one embodiment of the present invention. TPU 400 may comprise one or more platforms 401–404 for carrying out the features and functions of the present invention described above. TPU 400 may be located within a radio network controller.

The present invention has been described with regard to particular embodiments, all of which are intended to be illustrative rather than restrictive. Alternate embodiments will become apparent to those skilled in the art to which the present invention pertains without departing from its spirit and scope. For example, some or all of the platforms and components in the transmission section 202 and reception section 210 may be combined or further divided into additional components. Further, each platform and component may comprise a software/firmware program or programs, hardware or some combination of the two adapted to carry out the features and functions of the inventions described above and below. The scope of the present invention is described by the appended claims and supported by the foregoing description.

We claim:

1. A device for detecting the partial loss of an upper layer frame, comprising:
   a detection platform adapted to determine whether a received packet is a final packet in a particular upper layer frame;
   a comparator platform adapted to compare variables indicative of whether all received packets in the particular upper layer frame have been received correctly when a final packet is detected; and
   a transmission platform adapted to send a signal indicative of whether a correct version of the particular upper layer frame was received.

2. The device of claim 1, further comprising a reception unit adapted to receive at least one previously transmitted packet.

3. The device of claim 2, wherein a second device is adapted to transmit at least one packet in a particular upper layer frame to the reception unit.

4. The device of claim 1, wherein the variables comprise receiver state variable, VR(R).

5. The device of claim 1, wherein the transmission platform is further adapted to send another signal indicative of which additional packets of the correct version of the particular upper layer frame need to be received.

6. The device of claim 1, wherein the detection platform is further adapted to determine whether the received packet is in a next particular upper layer frame.

7. The device of claim 6, wherein the transmission platform is further adapted to send another signal indicative of which additional packets of the correct version of the particular upper layer frame need to be received when the received packet is in a next particular upper layer frame.

8. The device of claim 1, wherein the detection platform is further adapted to detect whether the received packet comprises a super field and to analyze the detected super field to determine whether the received packet is in a particular upper layer frame.

9. The device of claim 8, wherein the detection platform is further adapted to utilize the super field of the received packet to determine whether the received packet is in a next particular upper layer frame.

10. The device of claim 1, wherein the device comprises a traffic processing unit.

11. The device of claim 1, wherein the transmission platform is adapted to send the signal after a predetermined time period expires.

12. The device of claim 11, wherein the transmission platform is adapted to reset the predetermined time period.

13. A method for detecting the partial loss of an upper layer frame, comprising:
    determining whether a received packet is a final packet in a particular upper layer frame;
    comparing all received packets in the particular upper layer frame to variables indicative of whether all received packets in the particular upper layer frame have been received correctly when a final packet is detected; and
    sending a signal indicative of whether a correct version of the particular upper layer frame was received.

14. The method of claim 13, further comprising receiving at least one previously transmitted packet.

15. The method of claim 14, further comprising transmitting at least one packet in a particular upper layer frame.

16. The method of claim 13, further comprising sending another signal indicative of which additional packets of the correct version of the particular upper layer frame need to be received.

17. The method of claim 13, further comprising determining whether a received packet is in a next particular upper layer frame.

18. The method of claim 17, further comprising sending another signal indicative of which additional packets of the correct version of the particular upper layer frame need to be received when the received packet is in a next particular upper layer frame.

19. The method of claim 13, further comprising detecting whether a received packet comprises a super field and analyzing the detected super field to determine whether the received packet is in a particular upper layer frame.

20. The method of claim 19, further comprising utilizing the super field of the received packet to determine whether the received packet is in a next particular upper layer frame.

21. The method of claim 13, further comprising sending the signal after a predetermined time period expires.

22. The method of claim 21, further comprising resetting the predetermined time period.

* * * * *